United States Patent
Yokoyama

(10) Patent No.: US 8,081,826 B2
(45) Date of Patent: Dec. 20, 2011

(54) CHANGE IMAGE DETECTING DEVICE, CHANGE IMAGE DETECTING METHOD, COMPUTER PROGRAM FOR REALIZING CHANGE IMAGE DETECTING FUNCTION, AND RECORDING MEDIUM RECORDED WITH THE COMPUTER PROGRAM

(75) Inventor: Issei Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 12/012,018

(22) Filed: Jan. 31, 2008

(65) Prior Publication Data

US 2008/0187230 A1    Aug. 7, 2008

(30) Foreign Application Priority Data

Feb. 1, 2007    (JP) .................................. 2007-023033

(51) Int. Cl.
*G06K 9/62*    (2006.01)
(52) U.S. Cl. ........ 382/209; 382/100; 382/128; 382/129; 382/131; 382/173; 382/224; 345/545; 345/538
(58) Field of Classification Search .................. 382/209, 382/100, 128, 129, 131, 173, 224; 345/545, 345/538
See application file for complete search history.

(56) References Cited

U.S. PATENT DOCUMENTS

2004/0222995 A1* 11/2004 Colle ............................ 345/545
2005/0157949 A1*  7/2005 Aiso et al. ..................... 382/299
2007/0098277 A1*  5/2007 Watanabe et al. ............ 382/236

FOREIGN PATENT DOCUMENTS

JP    2005-018565 A    1/2005
JP    2005-33763       2/2005

* cited by examiner

*Primary Examiner* — Mike Rahmjoo
(74) *Attorney, Agent, or Firm* — AdvantEdge Law Group, LLC

(57) ABSTRACT

Change image detecting devices and methods are disclosed. In one example, a change image detecting device includes a change image detecting unit that selects a reference image and an image to be processed and a determination unit that compares an Na-th ('Na' is a natural number equal to or smaller than N) partial region of N ('N' is an integer equal to or larger than 2) partial regions. If the determination unit determines that there is a change, the change image detecting unit selects the image to be processed or an image, which is temporally later than the image to be processed, as a new reference image and detects the image to be processed or the image, which is temporally later than the image to be processed, as the change image.

6 Claims, 11 Drawing Sheets

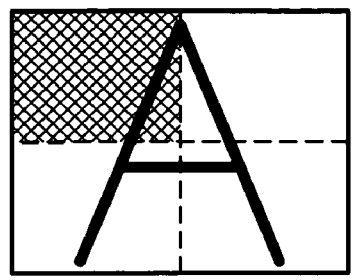
X(1) (PARTIAL REGION)
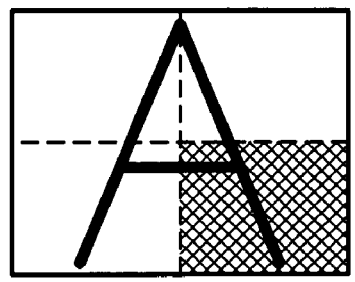
X(2) (PARTIAL REGION)
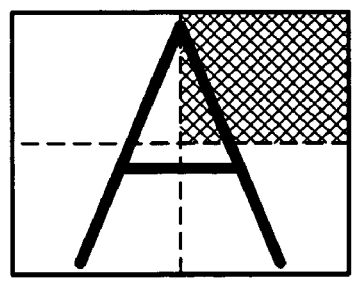
X(3) (PARTIAL REGION)
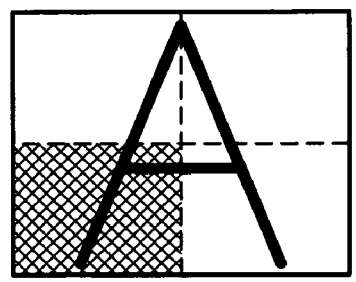
X(4) (PARTIAL REGION)
FIG. 7

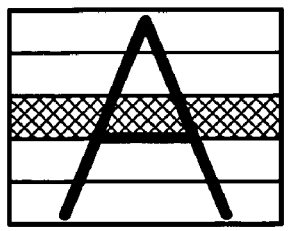
X(1) (PARTIAL REGION)
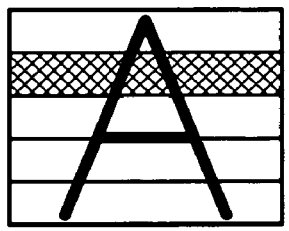
X(2) (PARTIAL REGION)
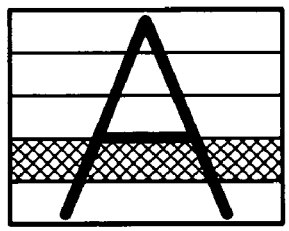
X(3) (PARTIAL REGION)
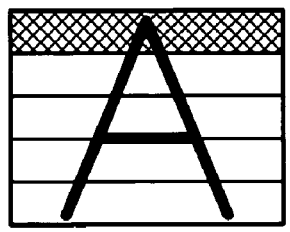
X(4) (PARTIAL REGION)
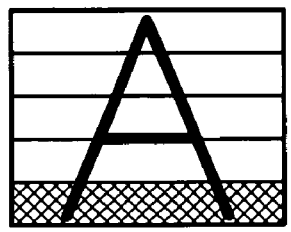
X(5) (PARTIAL REGION)
FIG. 8

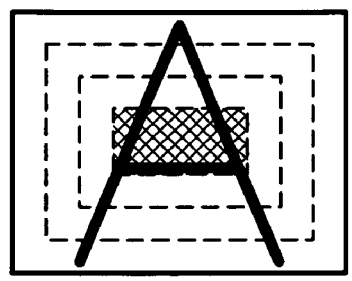
X(1) (PARTIAL REGION)
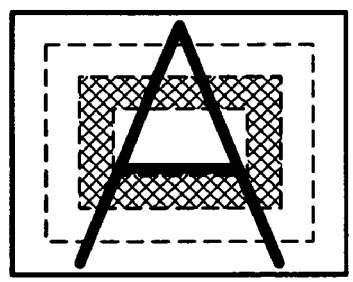
X(2) (PARTIAL REGION)
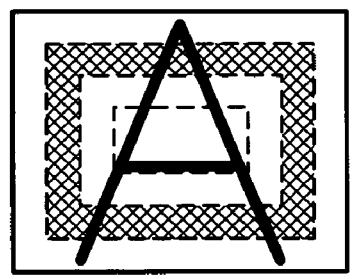
X(3) (PARTIAL REGION)
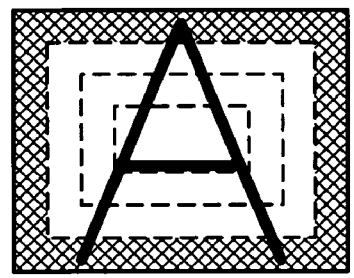
X(4) (PARTIAL REGION)
FIG. 10

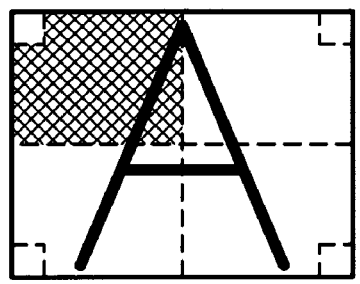
X(1) (PARTIAL REGION)
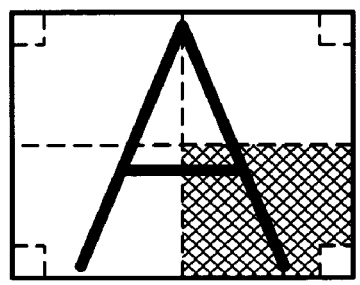
X(2) (PARTIAL REGION)
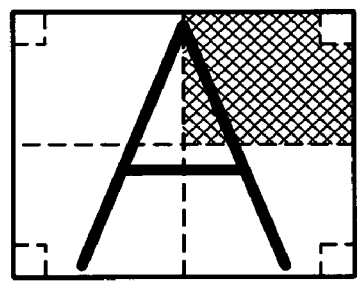
X(3) (PARTIAL REGION)
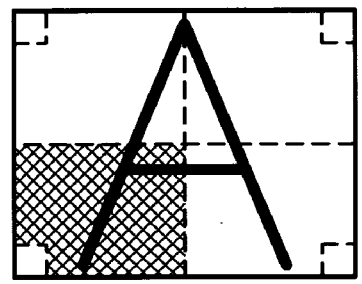
X(4) (PARTIAL REGION)
FIG. 11

CHANGE IMAGE DETECTING DEVICE, CHANGE IMAGE DETECTING METHOD, COMPUTER PROGRAM FOR REALIZING CHANGE IMAGE DETECTING FUNCTION, AND RECORDING MEDIUM RECORDED WITH THE COMPUTER PROGRAM

The entire disclosure of Japanese Patent Application No. 2007-023033, filed Feb. 1, 2007 is expressly incorporated by reference herein.

BACKGROUND

1. Technical Field

The present invention relates to a technique of detecting a change image, which has changed when compared with a temporally previous image, among a plurality of images arranged in time series.

2. Related Art

A moving image display system of performing projection display of a moving image by transmitting moving image data from a computer to a projector through a wireless LAN or the like is known. As such a moving image display system, a system of transmitting only a part of moving image data in order to reduce the amount of data transmitted from a computer to a projector has been proposed (refer to JP-A-2005-33763).

In the system disclosed in JP-A-2005-33763, each frame image, which forms a moving image, is compared with an immediately preceding frame image and then it is determined whether or not there is a change (difference). Then, if it is determined that there is a change, image data of a rectangular area including the entire difference region is transmitted from a computer to a projector. In the system having such a configuration, the amount of transmitted data may be reduced. However, since each frame image is compared with a previous frame image, it takes a very long time until detection of a change and transmission of image data are completed. Particularly in the case of capturing a moving image displayed on a display for a computer and transmitting the captured moving image to a projector, frame images to be compared are captured from a VRAM (video RAM), which is used for display on a display, sequentially to a general-purpose memory and are then compared with each other. In this case, since a VRAM that operates relatively slowly serves as a bottleneck, it takes a relatively long time to capture and compare frame images. As a result, it takes a very long time until transmission of image data of a change portion is completed.

In addition, the above-mentioned problem may occur in a case of performing data transmission of an image (hereinafter, referred to as a 'change image'), which has changed when compared with a temporally previous frame image, to an arbitrary image display device without being limited to a projector. Furthermore, the above-mentioned problem may occur in a case of transmitting a plurality of arbitrary images arranged in time series, such as images that can be obtained by continuous shooting of a digital still camera, without being limited to the moving image. Furthermore, even in a system of performing only detection of a change image without performing data transmission of the change image, the problem that a long time is required until detection of the change image is completed may occur.

SUMMARY

An advantage of some aspects of the invention is that it provides a technique capable of detecting a change image from a plurality of images arranged in time series within a relatively short time.

According to an aspect of the invention, a change image detecting device for detecting a change image, which has changed when compared with a temporally previous image, among a plurality of images arranged in time series includes: a change image detecting unit that selects a reference image and an image to be processed from the plurality of images; and a determination unit that compares an Na-th ('Na' is a natural number equal to or smaller than N) partial region of N ('N' is an integer equal to or larger than 2) partial regions, which are included in the entire region of the image to be processed, with a corresponding region, which exists at a position corresponding to the Na-th partial region, of the entire region of the reference image and determines whether or not there is a change therebetween. In the case when the determination unit determines that there is no change between the Na-th partial region and the corresponding region, the change image detecting unit selects an image, which is temporally later than the image to be processed, as a new image to be processed and the determination unit determines whether or not there is a change between an Nb-th (Nb=Na+1 when Na≠N, and Nb=1 when Na=N) partial region, which exists at a position different from the Na-th partial region of the entire region of the new image to be processed, and a corresponding region of the Nb-th partial region. In the case when the determination unit determines that there is a change between the Na-th partial region and the corresponding region, the change image detecting unit selects the image to be processed or an image, which is temporally later than the image to be processed, as a new reference image and detects the image to be processed or the image, which is temporally later than the image to be processed, as the change image.

Since the change image detecting device according to the aspect of the invention is configured to compare a partial region and a corresponding region with each other and determines whether or not there is a change therebetween, a determination on whether or not there is a change can be executed within a short time compared with a configuration in which it is detected whether or not there is a change by comparison of the entire region. Accordingly, a change image can be detected within a relatively short time. In addition, in the case when it is determined that there is no change between a partial region and a corresponding region, the Nb-th partial region and the corresponding region of the Nb-th partial region are compared and then it is determined whether or not there is a change therebetween. Accordingly, even in the case that a change occurs only at the position corresponding to the Nb-th partial region, such change can be detected. As a result, a change image can be properly detected.

The change image detecting device described above may further include a frame memory for storing a display image and a general-purpose memory, and the change image detecting unit may copy a part of images stored in the frame memory, as the partial region, to the general-purpose memory.

In this case, since a part of images is copied from the frame memory to the general-purpose memory in the configuration in which the general-purpose memory is used for determination on whether or not there is a change between the partial region and the corresponding region, it is possible to shorten a time required for copy compared with a case in which the entire region of an image is copied. Accordingly, even in the case that an operation speed of a frame memory is relatively low, it is possible to suppress mismatch between an image (display image) in the frame memory and a detected change image at the same point of time.

Furthermore, in the change image detecting device described above, each partial region may be a group of a plurality of sub-partial regions not adjacent to each other.

In this case, a determination on whether or not there is a change is made by comparing a plurality of sub-partial regions, which are not adjacent to each other, and corresponding regions with each other. As a result, since a range of an image covered in one determination on whether or not there is a change becomes relatively large, a change in a partial region within an image can be detected with a relatively small number of determinations.

Furthermore, in the change image detecting device described above, a group region configured to include the N partial regions may match the entire region of the image to be processed.

In this case, a change image can be detected by determining whether or not there is a change in the entire region of an image with determinations performed 'N' times.

Furthermore, the change image detecting device described above may further include an image transmission unit that transmits the change image to an image display device that is connected to the change image detecting device through a network.

In this case, even if an operation of a frame memory is relatively slow, it is possible to detect a change image within a relatively short time and to transmit the detected change image to the image display device. As a result, it is possible to suppress mismatch between an image (display image) in the frame memory and an image transmitted to the image display device at the same point of time.

In addition, the invention may be realized in various kinds of forms. For example, the invention may be realized in forms of a change image detecting method, a computer program for realizing the change image detecting method or a function of the change image detecting device, a recording medium recorded with the computer program, and data signals embodied in carriers so as to include the computer program.

BRIEF DESCRIPTION OF THE DRAWINGS

The invention will be described with reference to the accompanying drawings, wherein like numbers reference like elements.

FIG. 7 is an explanatory view illustrating a partial region in a second embodiment.

FIG. 8 is an explanatory view illustrating a partial region in a third embodiment.

FIG. 10 is an explanatory view illustrating a partial region in a fifth embodiment.

FIG. 11 is an explanatory view illustrating a partial region in a sixth embodiment.

DESCRIPTION OF EXEMPLARY EMBODIMENTS

Figure 1:
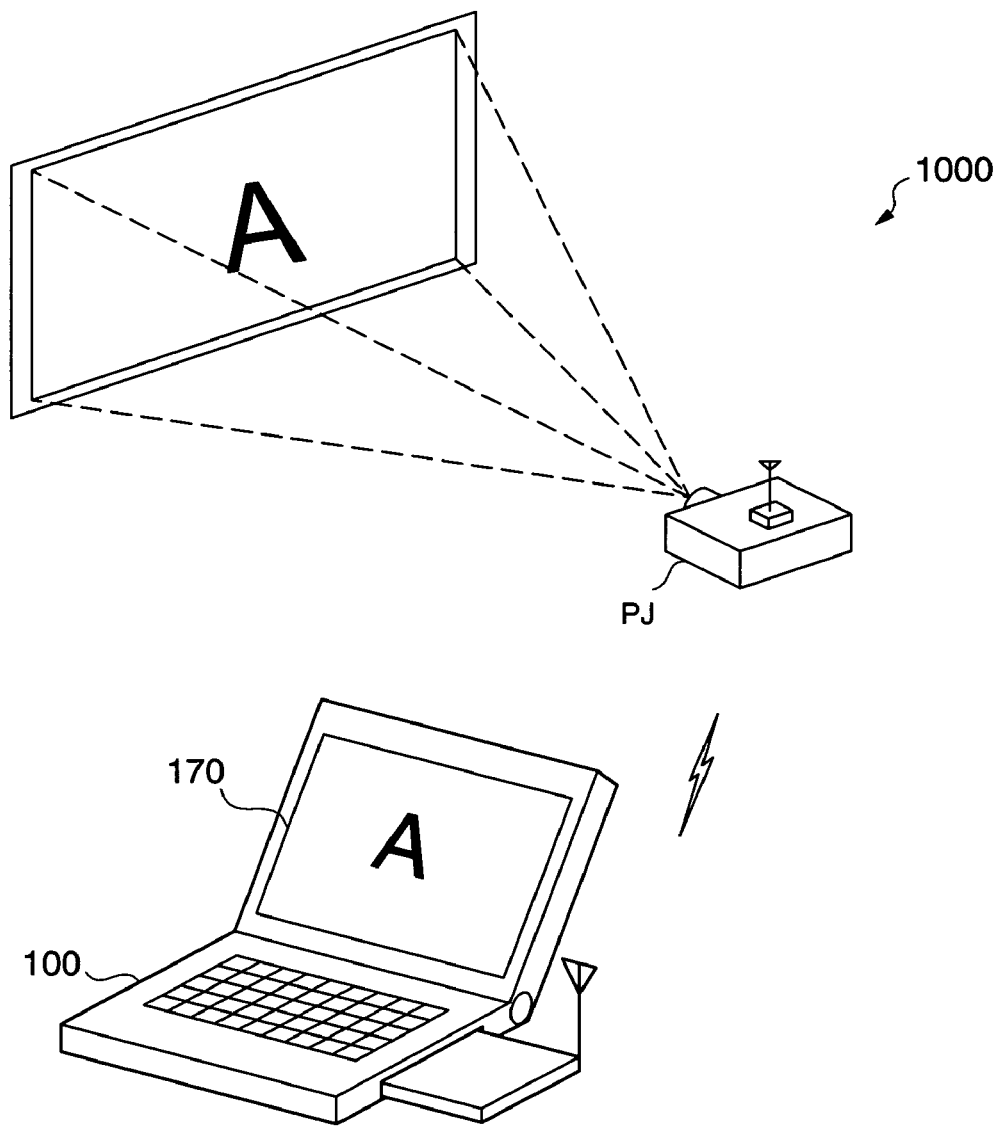
FIG. 1 is an explanatory view illustrating the schematic configuration of a presentation system to which a change image detecting device according to an embodiment of the invention is applied.

Hereinafter, preferred embodiments of the invention will be described in the following order.
A. First embodiment
B. Second embodiment
C. Third embodiment
D. Fourth embodiment
E. Fifth embodiment
F. Sixth embodiment
G. Modifications A. First Embodiment FIG. 1 is an explanatory view illustrating the schematic configuration of a presentation system to which a change image detecting device according to an embodiment of the invention is applied. A presentation system 1000 includes a notebook personal computer 100 and a projector PJ. In the presentation system 1000, data of a moving image displayed on a display 170 provided in the personal computer 100 is transmitted to the projector PJ and is then projected to be displayed.

Transmission of moving image data between the personal computer 100 and the projector PJ is performed through a wireless LAN (local area network). As the wireless LAN, for example, a wireless LAN based on IEEE (institute of electrical and electronics engineers) 802.11b standard, Bluetooth (registered trademark), and the like may be used. The projector PJ modulates illumination light emitted from a light source and performs projection display of an image by driving a liquid crystal panel (not shown) on the basis of received moving image data. In addition, the projector PJ may use an arbitrary light modulation device without being limited to the liquid crystal panel. For example, a DMD (digital micromirror device: registered trademark of TI, Inc., USA) may also be used.

Figure 2:
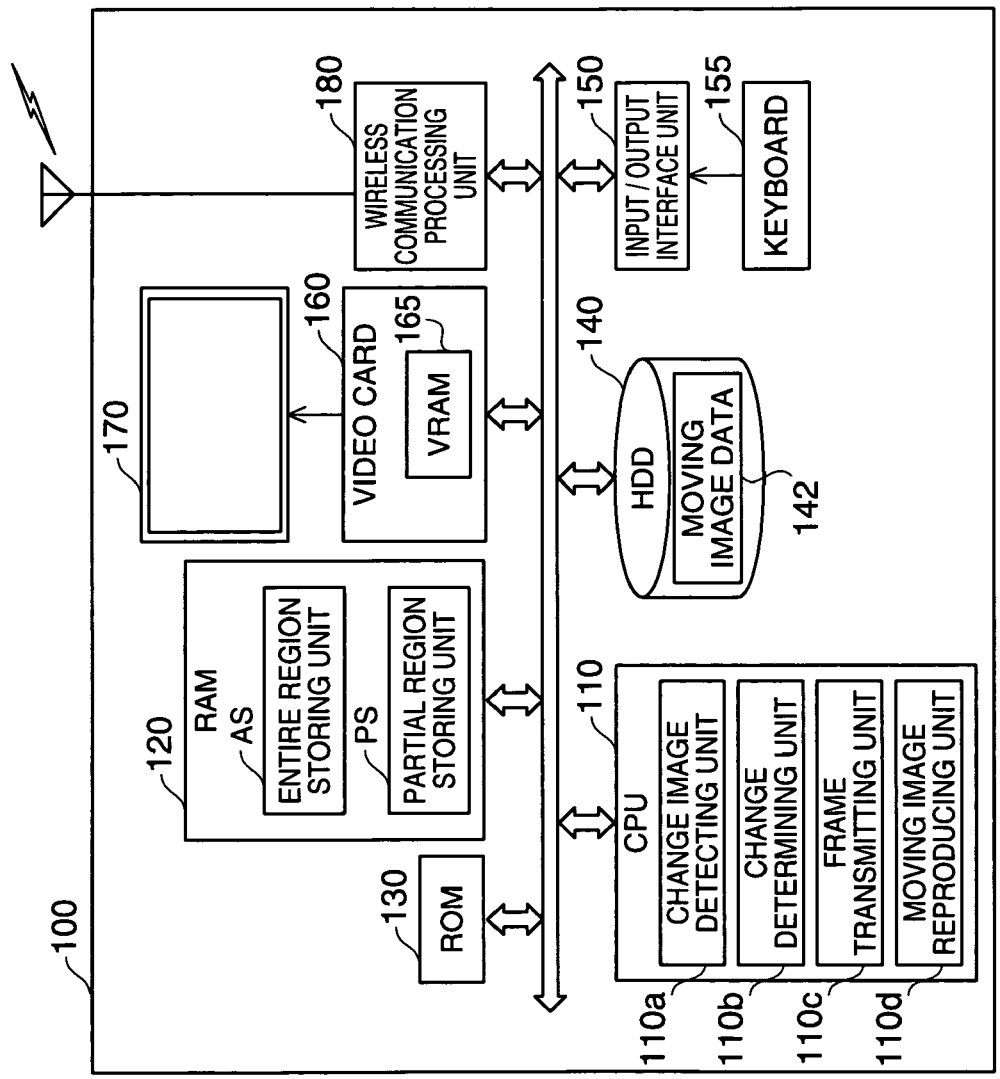
FIG. 2 is a block diagram illustrating the internal configuration of a personal computer shown in FIG. 1.

FIG. 2 is a block diagram illustrating the internal configuration of the personal computer 100 shown in FIG. 1. The personal computer 100 includes a CPU 110, a RAM 120, a ROM 130, a hard disk drive 140, an input/output interface unit 150, a keyboard 155, a video card 160, the display 170, and a wireless communication processing unit 180. The video card 160 includes a VRAM (video RAM) 165 used as a frame memory. The VRAM 165 can store moving image data, which is displayed on the display 170, corresponding to one frame. The RAM 120 is a general-purpose memory and includes an entire region storing unit AS and a partial region storing unit PS. The entire region storing unit AS can store image data of the entire region corresponding to one frame. On the other hand, the partial region storing unit PS can store image data of a part of a region (partial region) within one frame. The wireless communication processing unit 180 includes an electric wave transmitter, an electric wave receiver, an antenna, and the like and transmits and receives data through a wireless LAN. The input/output interface unit 150 transmits input data from the keyboard 155 to the CPU 110 or the like through an internal bus. Moving image data 142 configured to include a plurality of frame images is stored in the hard disk drive 140.

A program used to reproduce a moving image is stored in the ROM 130. When the program runs to be loaded to the RAM 120, the CPU 110 functions as a moving image reproducing unit 110d. In addition, a program for frame transmission used to transmit moving image data to the projector PJ (see FIG. 1) is stored in the ROM 130. When the program runs to be loaded to the RAM 120, the CPU 110 functions as a change image detecting unit 110a, and at the same time, functions as a change determining unit 110b and a frame transmitting unit 110c.

When a user selects a moving image reproduction menu while designating the moving image data 142 using the keyboard 155, the moving image reproducing unit 110d notifies the video card 160 of a drawing instruction. In response to the instruction from the moving image reproducing unit 110d, a video chip (not shown) in the video card 160 reads the moving image data 142 from the hard disk drive 140, generates image data, and writes the generated image data in the VRAM 165. In addition, the video chip (not shown) generates an image signal and outputs the generated image signal to the display 170 on the basis of the image data written in the VRAM 165. Here, one-frame image data is sequentially overwritten in the VRAM 165. As a result, a moving image is reproduced on the display 170 on the basis of the image data sequentially overwritten in the VRAM 165.

In the personal computer 100, frame transmission processing, which will be described later, is executed in order to cause almost the same moving image as that displayed on the display 170 to be projected and displayed in the projector PJ (see FIG. 1). In the frame transmission processing, the personal computer 100 captures frame image data stored in the VRAM 165 and transmits the captured frame image data to the projector PJ. At this time, in order to reduce the amount of data to be transmitted, the personal computer 100 compares each frame image with a temporally previous frame image and then transmits only a frame image (change image) which has changed.

Figure 3:
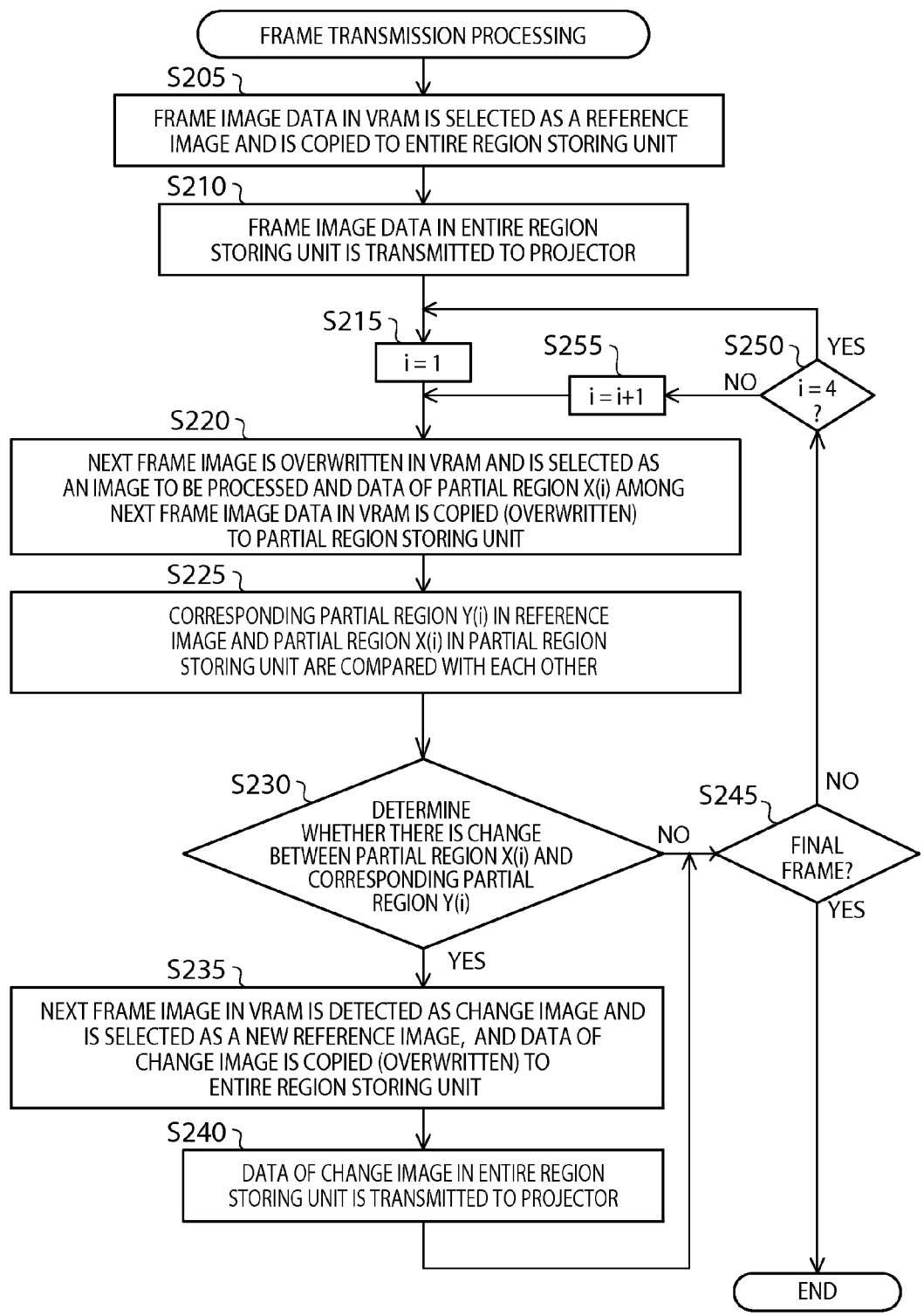
FIG. 3 is a flow chart illustrating detailed procedures of frame transmission processing executed in the personal computer.
Figure 4:
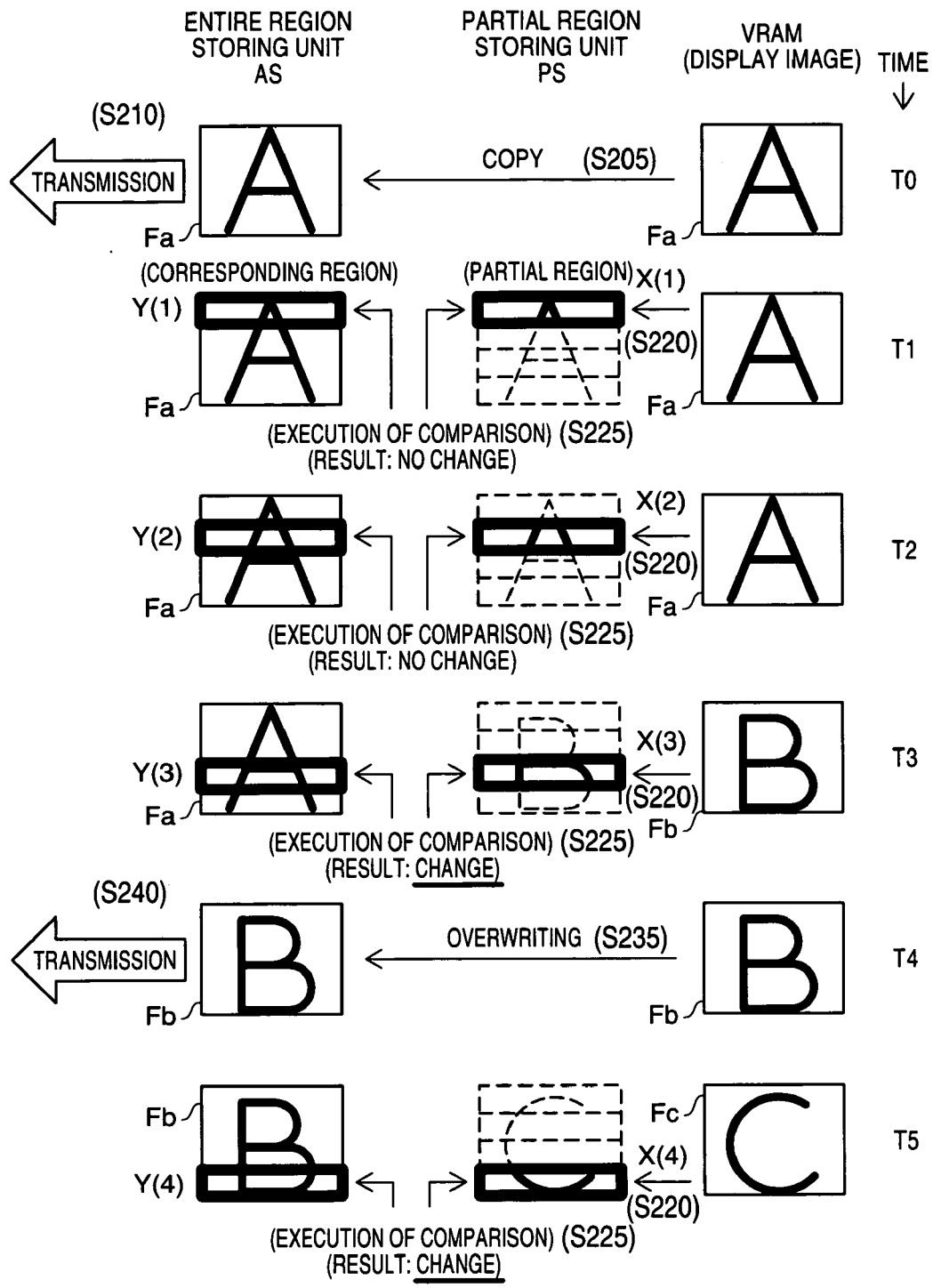
FIG. 4 is an explanatory view schematically illustrating how frame image data is transmitted by the frame transmission processing.

FIG. 3 is a flow chart illustrating detailed procedures of the frame transmission processing executed in the personal computer 100. In addition, FIG. 4 is an explanatory view schematically illustrating how frame image data is transmitted by the frame transmission processing. In FIG. 4, an image positioned at a leftmost column indicates an image (hereinafter, also referred to as a 'reference image') stored in the entire region storing unit AS (see FIG. 2). In addition, an image positioned at the middle column indicates an image (hereinafter, also referred to as a 'partial region image') stored in the partial region storing unit PS, and an image positioned at a rightmost column indicates a display image stored in the VRAM 165. In addition, in FIG. 4, respective images are arranged in time series downward from the above.

In the personal computer 100 (see FIG. 2), the frame transmission processing is executed when a user selects a moving image reproduction menu to instruct transmission of data to the projector PJ. In addition, it is assumed that the moving image data 142 stored in the hard disk drive 140 is reproduced.

In step S205 (see FIG. 3), the change image detecting unit 110a (see FIG. 2) reads frame image data in the VRAM 165 and copies the frame image data to the entire region storing unit AS as a reference image. At this time, the change image detecting unit 110a copies image data for the entire region corresponding to one frame in the VRAM 165. In step S210, the frame transmitting unit 110c reads frame image data of the reference image from the entire region storing unit AS and transmits the read frame image data to the projector PJ by controlling the wireless communication processing unit 180.

In the example shown in FIG. 4, at time T0, a frame image Fa in the VRAM 165 is copied to the entire region storing unit AS and is also transmitted to the projector PJ.

In step S215 (see FIG. 3), the change image detecting unit 110a substitutes '1' for a variable i indicating the order of a partial region. In step S220, the change image detecting unit 110a reads image data of a partial region X(i) among the one-frame image data in the VRAM 165 and copies the read image data to the partial region storing unit PS.

Figure 5:
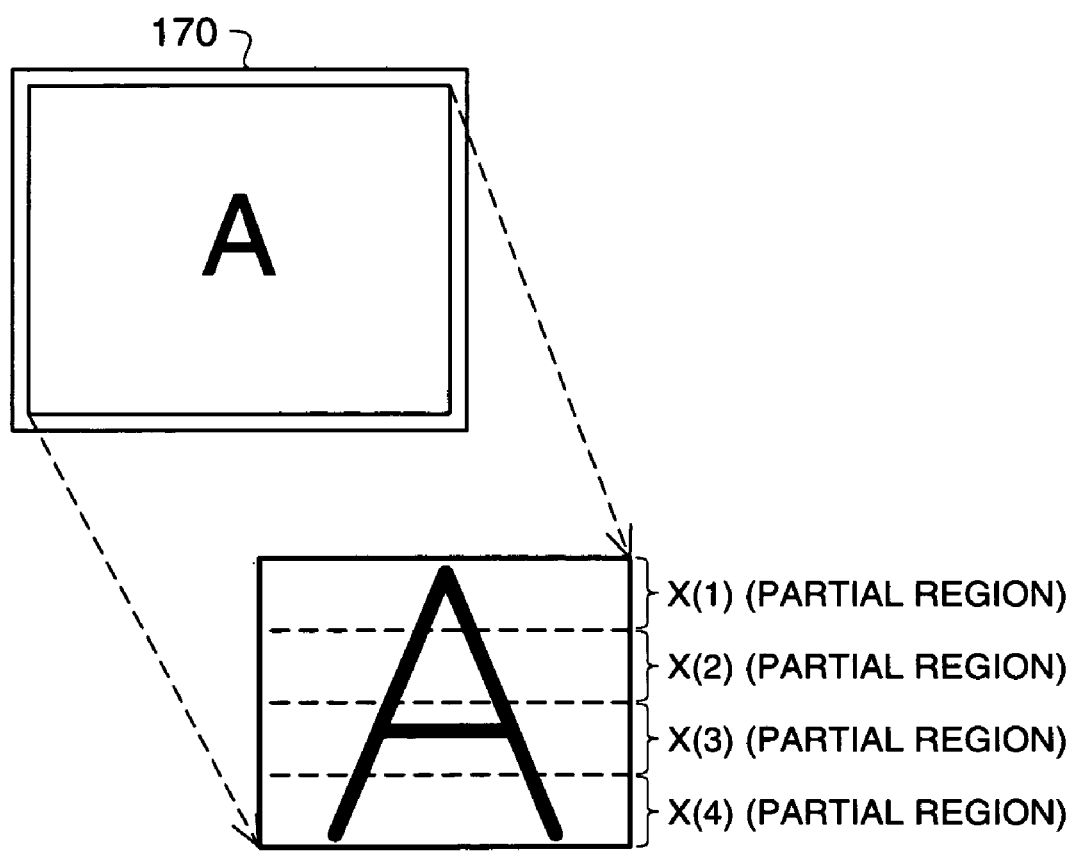
FIG. 5 is an explanatory view illustrating a partial region in a first embodiment.

FIG. 5 is an explanatory view illustrating a partial region in the first embodiment. In the presentation system 1000, an image corresponding to one frame is divided into four regions arranged in a line in the vertical direction and the four regions are set to partial regions X(1), X(2), X(3) and X(4), respectively. In addition, it is preferable that areas of the partial regions X(1) to X(4) be equal to one another. A number of each partial region in a parenthesis indicates the order of each partial region. In addition, this order is set beforehand to 1, 2, 3, and 4 in the order from the above according to the arrangement of the partial regions. In the example shown in FIG. 4, the partial region X(1) located at the top is copied to the partial region storing unit PS at time T1. In the following description, a region corresponding to the partial region X(i) (where i=1 to 4) is referred to as a 'corresponding region Y(i)'. In addition, a frame image, which is related with a partial region copied to the partial region storing unit PS, among frame images sequentially overwritten in the VRAM 165 is referred to as an 'image to be processed'. In addition, since the frame image data in the VRAM 165 is sequentially overwritten regardless of frame transmission processing, the frame image data in the VRAM 165 when executing the processing in step S220 may be different from data of a frame image (reference image) copied in step S205.

In step S225 (see FIG. 3), the change determining unit 110b compares the corresponding region Y(i) within the reference image with the partial region X(i) within the partial region storing unit PS. Specifically, the change determining unit 110b calculates a difference between pixel values of corresponding pixels of the corresponding region Y(i) within the entire region storing unit AS and the partial region X(i) within the partial region storing unit PS and calculates the sum of differences corresponding to all pixels. In the example shown in FIG. 4, the partial region X(1) and the corresponding region Y(1) are compared at time T1.

In step S230 (see FIG. 3), the change determining unit 110b determines whether or not there is a change in the corresponding region Y(i) and the partial region X(i). Specifically, the change determining unit 110b determines that there is a change if the sum of differences calculated in step S225 is larger than a threshold value that is set beforehand and determines that there is no change if the sum of differences is smaller than the threshold value. In the example shown in FIG. 4, it is determined that there is no change at time T1.

If it is determined that there is no change in step S230, the change image detecting unit 110a determines whether or not the frame image data in the VRAM 165 is last frame image data of a moving image (step S245). Then, if it is determined that the frame image data in the VRAM 165 is not the last frame image data, the change image detecting unit 110a determines whether or not the variable i is 4 (step S250). If it is determined that the variable i is not 4, the variable i is incremented by 1 (step S255). Then, processing from step S220 described above is executed again.

In the example shown in FIG. 4, it is determined that there is no change at time T1. In addition, it is determined that the frame image Fa is not the last frame image data. Accordingly, at time T2, the partial region X(2) of the frame image Fa stored in the VRAM 165 at this time is copied to the partial region storing unit PS. In addition, at time T2, a corresponding region Y(2) of the frame image Fa that is a reference image is compared with a partial region X(2) within the partial region storing unit PS. Here, there is no change of a moving image between time T0 and time T2. Accordingly, at time T2, the partial region X(2) and the corresponding region Y(2) are compared with each other in the frame image Fa that is the same as a reference image. Accordingly, in this case, it is determined again that there is no change in step S230.

On the other hand, if it is determined that there is a change in step S230 (see FIG. 3), the change image detecting unit 110a (see FIG. 2) reads frame image data in the VRAM 165 again and detects the read frame image data as a change image and copies (overwrites) the image data to entire region storing unit AS (step S235). As a result, the reference image is updated to the detected change image. In step S240, the frame transmitting unit 110c reads image data of the change image (new reference image) from the entire region storing unit AS and transmits the read image data to the projector PJ by controlling the wireless communication processing unit 180.

In the example shown in FIG. 4, a change of a moving image occurs between time T2 and time T3, such that contents of the frame image in the VRAM 195 change. Accordingly, at time T3, it is determined that there is a change in the partial region X(3) and a corresponding region Y(3) in step S230. At time T4, a frame image Fb stored in the VRAM 165 at this time is detected as a change image, such that the frame image Fb is overwritten to be copied as a new reference image in the entire region storing unit AS and is also transmitted to the projector PJ.

At time T5, the partial region X(4) of a frame image Fc stored in the VRAM 165 is copied to the partial region storing unit PS and a corresponding region Y(4) of the frame image Fb, which is a new reference image, and the partial region X(4) within the partial region storing unit PS are compared with each other.

In step S250 (see FIG. 3) described above, if it is determined that the variable i is 4, the process returns to step S215 in which 1 is substituted for the variable i and the above processing from step S220 is executed again. Accordingly, determination on whether or not there is a change in the corresponding region Y(1) and the partial region X(1) is made again. Then, if it is determined that the frame image data is last frame image data in step S245 described above, the frame transmission processing is completed.

Figure 6:
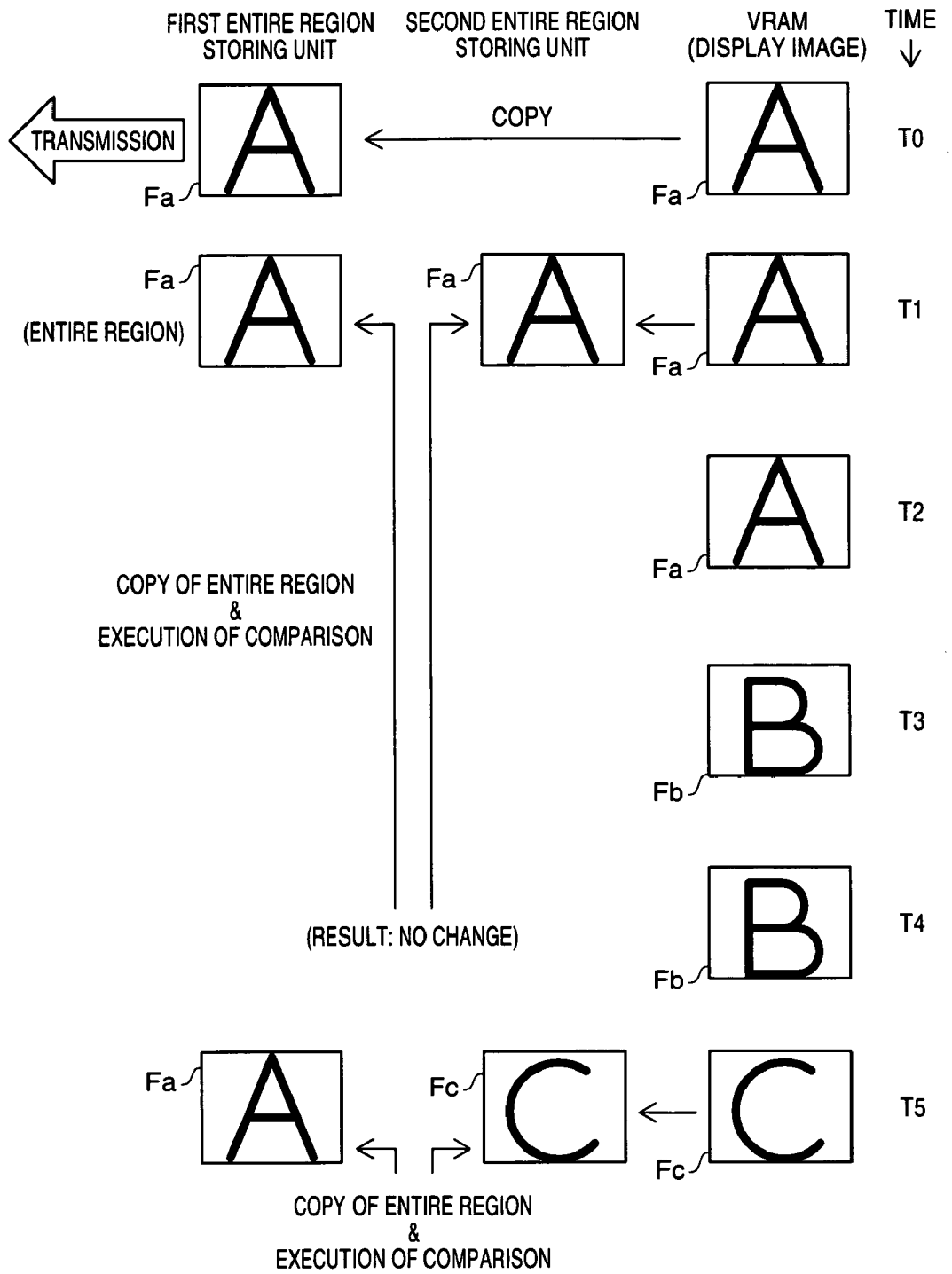
FIG. 6 is an explanatory view schematically illustrating how frame image data is transmitted in a comparative example.

FIG. 6 is an explanatory view schematically illustrating how frame image data is transmitted in a comparative example. Moreover, in this comparative example, two region storing units (a first region storing unit and a second region storing unit) capable of storing image data of the entire region corresponding to one frame are provided in a RAM included in a personal computer (not shown). A leftmost column in FIG. 6 indicates an image (reference image in the comparative example) stored in the first entire region storing unit. In addition, a middle column indicates an image (image to be processed in the comparative example) stored in the second entire region storing unit, and a rightmost column indicates an image stored in a VRAM.

At time T0, the entire region of the frame image Fa in the VRAM is copied to the first entire region storing unit and is then transmitted to the projector. At time T1, the frame image Fa in the VRAM is copied to the second entire region storing unit and comparison between a reference image (frame image Fa) within the first entire region storing unit and an image (frame image Fa) to be processed within the second entire region storing unit is started. Here, image data copied to the second entire region storing unit is data of the entire region of the frame image Fa. In addition, the image comparison is executed for the entire region. Accordingly, a period of time until a result of determination on whether or not there is a change comes out is a relatively long time compared with that in the embodiment described above. In the comparative example shown in FIG. 6, a determination result of 'no change' comes out at time T4. In this case, since a change image has not been detected, transmission of a frame image to a projector is not performed. Then, at time T5, the frame image Fc in the VRAM is copied, as a new image to be processed, to the second entire region storing unit and comparison between the frame image Fc and the frame image Fa, which is a reference image, is started.

Contents of the frame image in the VRAM change between time T2 and time T3. Accordingly, an image displayed on the display through the VRAM changes from the frame image Fa to the frame image Fb. On the other hand, as described above, the frame image Fb is not transmitted to the projector according to the determination result of 'no change' at time T4. Accordingly, projection display of the frame image Fa is continued in the projector. As a result, the image (frame image Fa), which is transmitted to the projector and is then projected to be displayed, and the image (frame image Fb) displayed on the display through the VRAM become different from each other.

As described above, in the frame transmission processing in the present embodiment, only a partial region of the entire region of a frame image within the VRAM 165 is copied (captured) to the partial region storing unit PS when a change of a moving image is determined, and the entire region of a change image is copied to the entire region storing unit AS only when it is determined that there is a change. Accordingly, even if an operation of the VRAM 165 is relatively slow, it is possible to shorten a period of time taken until a change image is detected as compared with the configuration in which the entire region of a frame image is copied from the VRAM whenever a change of a moving image is determined. As a result, it is possible to suppress mismatch between an image, which is displayed on the display 170 of the personal computer 100, and an image, which is projected to be displayed by the projector PJ, at the same point of time. In addition, a corresponding region and a partial region are compared with each other when a change of a moving image is determined. Accordingly, it is possible to shorten a period of time taken until a change image is detected as compared with the configuration in which a reference image and an image to be processed are compared with each other in the entire region. Furthermore, in the frame transmission processing, a corresponding region and a partial region at a different position from the previous position are compared with each other whenever determining whether or not there is a change of a moving image. Furthermore, a partial region and a corresponding region are compared such that the entire region corresponding to one frame is covered with four consecutive change determinations (steps S215 to S255 shown in FIG. 5). Accordingly, even if a change of a moving image is a change in a partial region within a frame image, such change can be detected by at least four consecutive change determinations if the change is continued for a period of time corresponding to four frames or more. As a result, it is possible to suppress a decrease in precision of change determination.

B. Second Embodiment

FIG. 7 is an explanatory view illustrating a partial region in the second embodiment. A presentation system in the second embodiment is different from the presentation system 1000 (see FIG. 1) in that the positions of the partial regions X(i) within frame images are different, and the other configurations thereof are the same as those in the first embodiment.

In the first embodiment, an image corresponding to one frame is divided into four regions arranged in a line in the vertical direction and the four regions are set to partial regions X(1) to X(4), respectively (see FIG. 4). On the other hand, in the present embodiment, as shown in FIG. 7, an image corresponding to one frame is divided into total four regions of two regions in the vertical direction and two regions in the horizontal directions. An upper left region is set to a partial region X(1), a lower right region is set to a partial region X(2), an upper right region is set to a partial region X(3), and a lower left region is set to a partial region X(4). Even in the case in which the partial regions X(1) to X(4) are set in such a manner, a change image can be detected within a relatively short time by frame transmission processing. In addition, as can also be understood from the present embodiment, the entire region corresponding to one frame may be divided into four partial regions each having an arbitrary shape. For example, the entire region corresponding to one frame may also be divided into four partial regions arranged in a line in the horizontal direction.

C. Third Embodiment

FIG. 8 is an explanatory view illustrating a partial region in the third embodiment. A presentation system in the third embodiment is different from the presentation system 1000 (see FIG. 1) in that the number of partial regions is different and methods of setting the order of partial regions are different, and the other configurations thereof are the same as those in the first embodiment.

In each of the embodiments described above, the number of partial regions is four including the partial regions X(1) to X(4). In contrast, in the present embodiment, five partial regions X(1) to X (5) are set. Such partial regions X(1) to X (5) are regions arranged in a line in the vertical direction, in the same manner as in the first embodiment. In addition, areas of the partial regions X(1) to X (5) are equal. Here, unlike the first embodiment, positions of the partial regions X(1) to X (5) are different from those in the first embodiment and are not arranged in the order from the above. Specifically, the partial region X(1) is a middle region, and the partial region X(2) is a region positioned right above the partial region X(1). In addition, the partial region X(3) is a region positioned right below the partial region X(1), and the partial region X(4) is an uppermost region. In addition, the partial region X (5) is a lowermost region. Accordingly, a region where change determination is to be made changes sequentially from the middle of a frame image to an outer side.

By adopting the configuration described above, the area of a partial region becomes smaller as compared with the configuration in which one frame is divided into four partial regions. As a result, it is possible to further shorten a time taken to copy image data from the VRAM 165 to the partial region storing unit PS and to further shorten a time required for one image comparison. Moreover, in the present embodiment, a region where change determination is to be made changes sequentially from the middle to an outer side. Accordingly, for a moving image in which a change occurs in a middle portion, a change of a moving image can be detected within a relatively short time as compared with the first and second embodiments.

D. Fourth Embodiment

Figure 9:
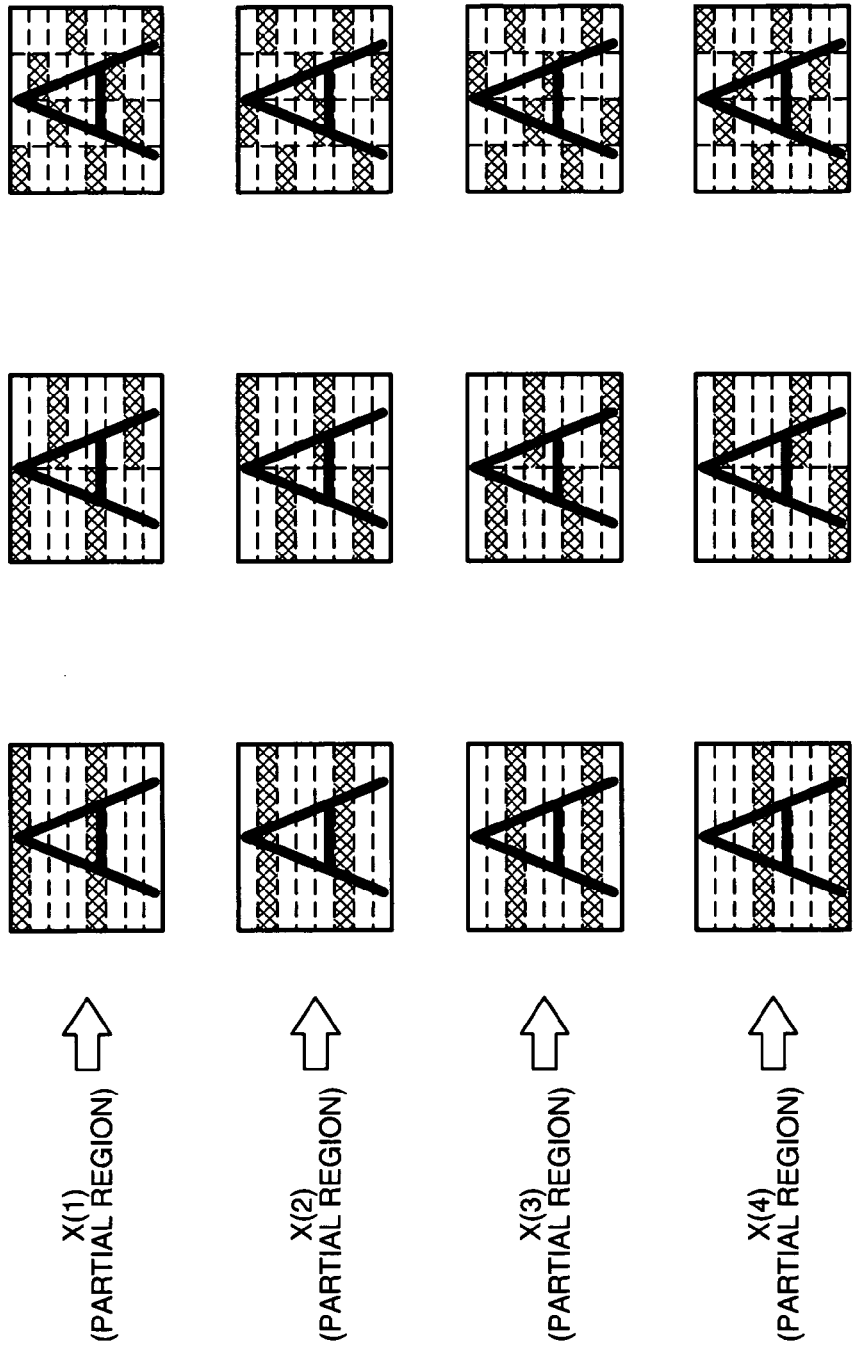
FIGS. 9A to 9C are explanatory views illustrating a partial region in a fourth embodiment.

FIGS. 9A to 9C are explanatory views illustrating a partial region in the fourth embodiment. A presentation system in the fourth embodiment is different from the presentation system 1000 (see FIG. 1) in that the shapes of partial regions are different, and the other configurations thereof are the same as those in the first embodiment. In each of the embodiments described above, the respective partial regions are one collected region. In contrast, each partial region in the present embodiment includes a group of a plurality of regions (hereinafter, referred to as 'sub-partial regions') that are distant from one another. Specifically, in FIG. 9A, the entire region corresponding to one frame is divided into eight sub-partial regions. In addition, a partial region X(1) is configured to include an uppermost sub-partial region and a fifth sub-partial region from the above. In addition, a partial region X(2) is configured to include second and sixth sub-partial regions from the above. A partial region X(3) is configured to include third and seventh sub-partial regions from the above. A partial region X(4) is configured to include a fourth sub-partial region from the above and a lowermost sub-partial region. In an example shown in FIG. 9B, the entire region corresponding to one frame is divided into sixteen sub-partial regions and one partial region is configured to include four different sub-partial regions distant from one another. Accordingly, the entire region is configured to include total four partial regions X(1) to X(4). In an example shown in FIG. 9C, the entire region corresponding to one frame is divided into thirty-two sub-partial regions and one partial region is configured to include eighth different sub-partial regions distant from one another. Accordingly, the entire region is configured to include four partial regions X(1) to X(4) in the same manner as in FIGS. 9A and 9B.

By adopting such a configuration, image comparison is performed for a plurality of sub-partial regions distant from one another with one change determination. Accordingly, in the case when a change of a moving image is a change in a partial region within a frame image, such a change can be detected with a smaller number of image comparisons than those in the first and second embodiments. That is, by configuring one partial region to include a larger number of sub-partial regions, it is possible to further increase a range of an image covered by one image comparison. Thus, it becomes possible to detect a change of a moving image with a smaller number of image comparisons. In addition, if the number of sub-partial regions included in a partial region is significantly increased, an overhead time required for searching image data of each sub-partial region from the VRAM 165 and copying the image data to the RAM 120 is increased. As a result, considerably, it becomes difficult to shorten the time taken to detect a change of a moving image.

E. Fifth Embodiment

FIG. 10 is an explanatory view illustrating a partial region in the fifth embodiment. A presentation system in the fifth embodiment is different from the presentation system 1000 (see FIG. 1) in that the shapes of partial regions are different, and the other configurations thereof are the same as those in the first embodiment. In the first embodiment described above, the partial regions X(1) to X(4) have the same shape and the same area. In contrast, the partial regions X(1) to X(4) in the present embodiment have different areas, and the shape of the partial region X(1) is different from those of the partial regions X(2) to X(4).

Specifically, the shape of the partial region X(1) is a rectangle. On the other hand, the shape of the partial region X(2) is a doughnut shape surrounding the partial region X(1). In addition, the shape of the partial region X(3) is a doughnut shape like the partial region X(2) but the area of the partial region X(3) is larger than that of the partial region X(2). The shape of the partial region X(4) is a doughnut shape like the partial regions X(2) and X(3) but the area of the partial region X(4) is larger than that of the partial region X(3). Even in this configuration, a change image can be detected within a relatively short time by frame transmission processing. In addition, unlike the present embodiment, a configuration in which only one of the area and the shape is different for partial regions may be adopted.

F. Sixth Embodiment

FIG. 11 is an explanatory view illustrating a partial region in the sixth embodiment. A presentation system in the sixth embodiment is different from the presentation system in the second embodiment in that the shapes of partial regions are different and a region obtained by putting all partial regions together does not coincide with the entire region of a frame image, and the other configurations thereof are the same as those in the second embodiment.

Partial regions X(1) to X(4) in the present embodiment have shapes excluding rectangular regions near apices of a frame image from the partial regions X(1) to X(4) in the second embodiment (see FIG. 7), respectively. Accordingly, a region obtained by putting the partial regions X(1) to X(4) together does not coincide with the entire region of the frame image. Even in this case in which a change image is detected on the basis of such partial regions X(1) to X(4), image data transmitted to the projector PJ is image data (image data corresponding to one frame) of the entire region of the change image.

In such a configuration, the area of each partial region is decreased as compared with that in the second embodiment. Accordingly, it is possible to shorten a time taken to copy image data from the VRAM 165 to the partial region storing unit PS and a time required for image comparison. Furthermore, in the present embodiment, in the case where a moving image changes in only rectangular regions corresponding to four corners of a frame image, such a change cannot be detected. However, a frequency of occurrence of a change in only the rectangular regions is assumed to be low. Therefore, even in such a configuration, it is thought that the precision of change determination on a moving image is not noticeably decreased.

G. Modifications

In addition, an element other than elements, which are claimed in the following independent claims, among constituent elements in each of the embodiments described above is an additional element and may be properly omitted. In addition, the invention is not limited to the above-described embodiments, but various modifications may be made within the scope without departing from the subject matter or spirit of the invention. For example, the following modifications may also be made.

G1. First Modification

In each of the embodiments described above, a detected change image is transmitted to the projector PJ. However, the invention is not limited to such a configuration. For example, the invention may be configured by using a change image detecting device that performs processing until a change image is detected from a moving image without performing transmission of the change image. In this case, image data copied to the entire region storing unit AS or the partial region storing unit PS in step S205, step S220, or the like is not read from the VRAM 165 but from the hard disk drive 140. Even in this configuration, a change image can be detected within a short time as compared with a configuration in which image data of the entire region of a frame image is read from the hard disk drive 140 and image comparison is performed by using the image data of the entire region. Furthermore, in each of the embodiments described above, if it is determined that there is a change, image data corresponding to one frame is read again from the VRAM 165 and is then transmitted to the projector PJ. As a result, there is a possibility that an image, which is displayed on the display 170 when it is determined that there is a change, and an image, which is actually transmitted to the projector PJ, may not be equal. However, by detecting a change image beforehand and then displaying only the change image on the display 170 while transmitting the change image to the projector PJ as described above, it is possible to suppress mismatch between display images.

G2. Second Modification

In the first embodiment described above, the order of the partial regions X(1) to X(4) is set to 1, 2, 3, and 4 sequentially from the above according to the arrangement of the partial regions. In addition, in the third embodiment, the partial regions X(1) to X(5) are set to 1, 2, 3, 4, and 5, respectively, sequentially from a middle portion of an image to an outer side. However, the order is not limited to the above, but an arbitrary order may be set. For example, in the case when partial regions are four regions X(1) to X(4) arranged in a line in the vertical direction like the first embodiment, the order may be set to 1, 2, 3, and 4 upward from the below. Furthermore, in the case where the entire region corresponding to one frame is made to be covered by four consecutive change determinations, a partial region (and a corresponding region) to be compared may be determined at random whenever a change determination is performed. Furthermore, in the case where each partial region (each corresponding region) is set as an object to be compared at the same frequency for a relatively long period of time, all the partial regions may not be covered with four consecutive change determinations. Furthermore, in the first embodiment described above, a partial region and a corresponding region to be compared with each other are determined from the partial regions X(1) to X(4) according to a predetermined order regardless of a result of immediately preceding change determination. The invention is not limited thereto. For example, a partial region and a corresponding region to be compared next may be determined in accordance with the result of change determination. Specifically, for example, in the case when it is determined that there is a change, the partial region X(1) and the corresponding region Y(1) may be set as next objects to be compared even if objects that were compared immediately before are any partial region and any corresponding region. Alternatively, in the case when it is determined that there is a change, a partial region and a corresponding region at the same positions as objects previously compared may be set as next objects to be compared. As can be understood from the embodiments and the modifications described above, a partial region and a corresponding region at the arbitrary positions may be set as objects to be compared as long as a partial region and a corresponding region at the same positions are not always set as objects to be compared.

G3. Third Modification

In each of the embodiments described above, image data transmitted to the projector PJ is image data of the entire region of a change image. However, image data of a partial region in a change image may be transmitted. Specifically, for example, only image data of a region, which corresponds to a predetermined window (for example, a window for reproduction of a moving image), of the entire regions (desktop region)

displayed on the display 170 may be transmitted to the projector PJ. In this case, by performing a change determination on only the region corresponding to such window, a change of a moving image displayed within the window can be detected in a relatively short time. Moreover, in the case when it is determined that there is a change, only image data of a partial region, which is to be compared, of the entire region of a change image may be read from the partial region storing unit PS and be transmitted to the projector PJ. By adopting such a configuration, it is possible to reduce the amount of data transmitted from the personal computer 100 to the projector PJ at a time, as compared with a configuration in which image data of the entire region of a change image is transmitted. Moreover, in such a configuration, an image projected to be displayed by the projector PJ may be an odd image that is partially updated. Accordingly, in the case when it is determined that there is a change, a reference image in the entire region storing unit AS is made not to be updated in subsequent three consecutive change determinations. In this way, since it can be determined that there is a change consecutively four times, image data of partial regions X(1) to X(4) can be sequentially read from the partial region storing unit PS and is then transmitted to the projector PJ. Accordingly, since an image projected to be displayed by the projector PJ is updated to an image changed in the entire region, an odd image can be eliminated.

G4. Fourth Modification

In each of the embodiments described above, the position, area, and shape of a partial region are set beforehand. However, the position, area, and shape of a partial region may be dynamically changed according to a result change determination. Specifically, for example, in the case when it is determined that there is a change consecutively four times, a region having an area smaller than a partial region in previous change determinations may be set as a new partial region in a subsequent change determination. Since it is consecutively determined that there is a change, the contents of a moving image are considered to change frequently. In this case, a possibility that it will be determined that there is a change even in a subsequent change determination is high. Accordingly, there is a high possibility of detecting a change of a moving image even if the area of a partial region is relatively small. By adopting such a configuration, the amount of data copied from the VRAM 165 and the amount of data compared at the time of change determination can be reduced. As a result, it becomes possible to detect a change image within a shorter time.

G5. Fifth Modification

In each of the embodiments described above, a change image in a moving image is detected. However, a change image may also be detected from a plurality of arbitrary images arranged in time series without being limited to the moving image. Specifically, an image that has changed when compared with a temporally previous image may be detected from a plurality of images obtained by continuous shooting of a digital still camera, for example.

G6. Sixth Modification

In each of the embodiments described above, the moving image data 142 is stored in the hard disk drive 140. However, the moving image data 142 may be stored in an arbitrary storage device without being limited to the hard disk drive 140. For example, in the case of a configuration in which the personal computer 100 includes a memory card drive, moving image data may be stored in a memory card inserted in the memory card drive. In addition, in the case of a configuration in which the personal computer 100 is connected to not only a wireless LAN but also a cable LAN, it may be possible to adopt a configuration in which moving image data stored in a content server (not shown) or the like is read through the cable LAN.

G7. Seventh Modification

In each of the embodiments described above, a part of configuration realized by hardware may be replaced with software. On the contrary, a part of configuration realized by software may be replaced with hardware.

What is claimed is:

1. A change image detecting device that detects a change image, which has changed when compared with a temporally previous image, among a plurality of images arranged in a time series, the change image detecting device comprising:

a change image detecting unit that selects a first image as a reference image and a second image as an image to be processed, the first image and the second image being selected from a plurality of images;

a determination unit that:

compares an Na-th ('Na' is a natural number equal to or smaller than N) partial region of N ('N' is an integer equal to or larger than 2) partial regions of the second image with a corresponding Na-th partial region of N partial regions of the first image, the Na-th partial region of the second image and the corresponding Na-th partial region of the first image being located at the same image position, and determines whether or not there is a change between the Na-the partial region of the second image and the corresponding Na-th partial region of the first image; and an image transmission unit, wherein:

when the determination unit determines that there is a change between the Na-th partial region of the second image and the corresponding Na-th partial region of the first image:

the change image detecting unit detects the second image or another image from the plurality of images as a change image, the another image being arranged temporally later in the time series than the second image, the change image detecting unit selects the second image or the another image as a new reference image, and the image transmission unit transmits the change image to an image display device that is connected to the change image detecting device through a network, and when the determination unit determines that there is no change between the Na-th partial region of the second image and the corresponding Na-th partial region of the first image:

the change image detecting unit selects a third image as a new image to be processed, the third image being selected from the plurality of images, the third image being arranged temporally later in the time series than the second image, and the determination unit determines whether or not there is a change between an Nb-th (Nb=Na+1 when Na≠N, and Nb=1 when Na=N) partial region of N partial regions of the third image and a corresponding Nb-th partial region of the N partial regions of the first image, the Nb-th partial region of the third image being located at an image position different from an Na-th partial region of the N partial regions of the third image;

wherein:

when the determination unit determines that there is a change between the Nb-th partial region of the third image and the corresponding Nb-th partial region of the first image:

the change image detecting unit detects the third image or another image from the plurality of images as a change image, the another image being arranged temporally later in the time series than the third image, the change image detecting unit selects the third image or the another image as a new reference image, and the image transmission unit transmits the change image to an image display device that is connected to the change image detecting device through a network, and when the determination unit determines that there is no change between the Nb-th partial region of the third image and the corresponding Nb-th partial region of the first image:

the change image detecting unit selects a fourth image as a new image to be processed, the fourth image being selected from the plurality of images, the fourth image being arranged temporally later in the time series than the third image, and the determination unit determines whether or not there is a change between an Nc-th (Nc=Nb+1 when Nb≠N, and Nc=1 when Nb=N) partial region of N partial regions of the fourth image and a corresponding Nc-th partial region of the N partial regions of the first image, the Nc-th partial region of the fourth image being located at an image position different from an Nb-th partial region of the N partial regions of the third image;

wherein:

when the determination unit determines that there is a change between the Nc-th partial region of the fourth image and the corresponding Nc-th partial region of the first image:

the change image detecting unit detects the fourth image or another image from the plurality of images as a change image, the another image being arranged temporally later in the time series than the fourth image, the change image detecting unit selects the fourth image or the another image as a new reference image, and the image transmission unit transmits the change image to an image display device that is connected to the change image detecting device through a network, and when the determination unit determines that there is no change between the Nc-th partial region of the fourth image and the corresponding Nc-th partial region of the first image:

the change image detecting unit selects a fifth image as a new image to be processed, the fifth image being selected from the plurality of images, the fifth image being arranged temporally later in the time series than the fourth image, and the determination unit determines whether or not there is a change between an Nd-th (Nd=Nc+1 when Nc≠N, and Nd=1 when Nc=N) partial region of N partial regions of the fifth image and a corresponding Nd-th partial region of the N partial regions of the first image, the Nd-th partial region of the fifth image being located at an image position different from an Nc-th partial region of the N partial regions of the fourth image; and wherein:

when the determination unit determines that there is a change between the Nd-th partial region of the fifth image and the corresponding Nd-th partial region of the first image:

the change image detecting unit detects the fifth image or another image from the plurality of images as a change image, the another image being arranged temporally later in the time series than the fifth image, the change image detecting unit selects the fifth image or the another image as a new reference image, and the image transmission unit transmits the change image to an image display device that is connected to the change image detecting device through a network.

2. The change image detecting device according to claim 1, further comprising:

a video card including a frame memory for storing a display image; and a general-purpose memory, wherein the change image detecting unit copies a part of images stored in the frame memory of the video card, as the partial region, to the general-purpose memory.

3. The change image detecting device according to claim 1, wherein each partial region is a group of a plurality of sub-partial regions not located adjacent to each other.

4. The change image detecting device according to claim 1, wherein a group region that includes all of the N partial regions of the image to be processed matches the entire region of the image to be processed.

5. A computer-implemented change image detecting method of detecting a change image, which has changed when compared with a temporally previous image, among a plurality of images arranged in a time series, at least a portion of the method being performed by a computing device comprising at least one processor, the method comprising:

selecting a first image as a reference image and a second image as an image to be processed, the first image and the second image being selected from a plurality of images;

comparing an Na-th ('Na' is a natural number equal to or smaller than N) partial region of N ('N' is an integer equal to or larger than 2) partial regions of the second image with a corresponding Na-th partial region of N partial regions of the first image the Na-th partial region of the second image and the corresponding Na-th partial region of the first image being located at the same image position;

determining whether or not there is a change between the Na-th partial region of the second image and the corresponding Na-th partial region of the first image;

when it is determined that there is a change between the Na-th partial region of the second image and the corresponding Na-th partial region of the first image:

detecting the second image or another image from the plurality of images as a change image, the another image being arranged temporally later in the time series than the second image, selecting the second image or the another image as a new reference image, and transmitting the change image to an image display device for display, the display device being connected to the change image detecting device through a network;

when it is determined that there is no change between the Na-th partial region of the second image and the corresponding Na-th partial region of the first image:
selecting a third image as a new image to be processed, the third image being selected from the plurality of images, the third image being arranged temporally later in the time series than the second image, and
determining whether or not there is a change between an Nb-th (Nb=Na+1 when Na≠N, and Nb=1 when Na=N) partial region of N partial regions of the third image and a corresponding Nb-th partial region of the N partial regions of the first image, the Nb-th partial region of the third image being located at an image position different from an Na-th partial region of the N partial regions of the third image;
when it is determined that there is a change between the Nb-th partial region of the third image and the corresponding Nb-th partial region of the first image:
detecting the third image or another image from the plurality of images as a change image, the another image being arranged temporally later in the time series than the third image,
selecting the third image or the another image as a new reference image, and
transmitting the change image to an image display device for display, the display device being connected to the change image detecting device through a network, and
when it is determined that there is no change between the Nb-th partial region of the third image and the corresponding Nb-th partial region of the first image:
selecting a fourth image as a new image to be processed, the fourth image being selected from the plurality of images, the fourth image being arranged temporally later in the time series than the third image, and
determining whether or not there is a change between an Nc-th (Nc=Nb+1 when Nb≠N, and Nc=1 when Nb=N) partial region of N partial regions of the fourth image and a corresponding Nc-th partial region of the N partial regions of the first image, the Nc-th partial region of the fourth image being located at an image position different from an Nb-th partial region of the N partial regions of the third image;
when it is determined that there is a change between the Nc-th partial region of the fourth image and the corresponding Nc-th partial region of the first image:
detecting the fourth image or another image from the plurality of images as a change image, the another image being arranged temporally later in the time series than the fourth image,
selecting the fourth image or the another image as a new reference image, and
transmitting the change image to an image display device for display, the display device being connected to the change image detecting device through a network, and
when it is determined that there is no change between the Nc-th partial region of the fourth image and the corresponding Nc-th partial region of the first image:
selecting a fifth image as a new image to be processed, the fifth image being selected from the plurality of images, the fifth image being arranged temporally later in the time series than the fourth image, and
determining whether or not there is a change between an Nd-th (Nd=Nc+1 when Nc≠N, and Nd=1 when Nc=N) partial region of N partial regions of the fifth image and a corresponding Nd-th partial region of the N partial regions of the first image, the Nd-th partial region of the fifth image being located at an image position different from an Nc-th partial region of the N partial regions of the fourth image; and
when it is determined that there is a change between the Nd-th partial region of the fifth image and the corresponding Nd-th partial region of the first image:
detecting the fifth image or another image from the plurality of images as a change image, the another image being arranged temporally later in the time series than the fifth image,
selecting the fifth image or the another image as a new reference image, and
transmitting the change image to an image display device for display, the display device being connected to the change image detecting device through a network.

6. A computer program embodied in a non-transitory computer-readable medium, the computer program detecting a change image, which has changed when compared with a temporally previous image, among a plurality of images arranged in a time series, the computer program causing a computer to execute:
selecting a first image as a reference image and a second image as an image to be processed, the first image and the second image being selected from a plurality of images;
comparing an Na-th ('Na' is a natural number equal to or smaller than N) partial region of N ('N' is an integer equal to or larger than 2) partial regions of the second image with a corresponding Na-th partial region of N partial regions of the first image, the Na-th partial region of the second image and the corresponding Na-th partial region of the first image being located at the same image position;
determining whether or not there is a change between the Na-th partial region of the second image and the corresponding Na-th partial region of the first image;
when it is determined that there is a change between the Na-th partial region of the second image and the corresponding Na-th partial region of the first image:
detecting the second image or another image from the plurality of images as a change image, the another image being arranged temporally later in the time series than the second image;
selecting the second image or the another image as a new reference image, and
transmitting the change image to an image display device for display, the display device being connected to the change image detecting device through a network;
when it is determined that there is no change between the Na-th partial region of the second image and the corresponding Na-th partial region of the first image:
selecting a third image as a new image to be processed, the third image being selected from the plurality of images, the third image being arranged temporally later in the time series than the second image, and
determining whether or not there is a change between an Nb-th (Nb=Na+1 when Na≠N, and Nb=1 when Na=N) partial region of N partial regions of the third image and a corresponding Nb-th partial region of the N partial regions of the first image, the Nb-th partial region of the third image being located at an image position different from an Na-th partial region of the N partial regions of the third image;

when it is determined that there is a change between the Nb-th partial region of the third image and the corresponding Nb-th partial region of the first image:
  detecting the third image or another image from the plurality of images as a change image, the another image being arranged temporally later in the time series than the third image,
  selecting the third image or the another image as a new reference image, and
  transmitting the change image to an image display device for display, the display device being connected to the change image detecting device through a network, and
when it is determined that there is no change between the Nb-th partial region of the third image and the corresponding Nb-th partial region of the first image:
  selecting a fourth image as a new image to be processed, the fourth image being selected from the plurality of images, the fourth image being arranged temporally later in the time series than the third image, and
  determining whether or not there is a change between an Nc-th (Nc=Nb+1 when Nb≠N, and Nc=1 when Nb=N) partial region of N partial regions of the fourth image and a corresponding Nc-th partial region of the N partial regions of the first image, the Nc-th partial region of the fourth image being located at an image position different from an Nb-th partial region of the N partial regions of the third image;
when it is determined that there is a change between the Nc-th partial region of the fourth image and the corresponding Nc-th partial region of the first image:
  detecting the fourth image or another image from the plurality of images as a change image, the another image being arranged temporally later in the time series than the fourth image,
  selecting the fourth image or the another image as a new reference image, and
  transmitting the change image to an image display device for display, the display device being connected to the change image detecting device through a network, and
when it is determined that there is no change between the Nc-th partial region of the fourth image and the corresponding Nc-th partial region of the first image:
  selecting a fifth image as a new image to be processed, the fifth image being selected from the plurality of images, the fifth image being arranged temporally later in the time series than the fourth image, and
  determining whether or not there is a change between an Nd-th (Nd=Nc+1 when Nc≠N, and Nd=1 when Nc=N) partial region of N partial regions of the fifth image and a corresponding Nd-th partial region of the N partial regions of the first image, the Nd-th partial region of the fifth image being located at an image position different from an Nc-th partial region of the N partial regions of the fourth image; and
when it is determined that there is a change between the Nd-th partial region of the fifth image and the corresponding Nd-th partial region of the first image:
  detecting the fifth image or another image from the plurality of images as a change image, the another image being arranged temporally later in the time series than the fifth image,
  selecting the fifth image or the another image as a new reference image, and
  transmitting the change image to an image display device for display, the display device being connected to the change image detecting device through a network.

* * * * *